United States Patent [19]

Preston et al.

[11] 4,140,667

[45] Feb. 20, 1979

[54] GRAFT COPOLYMERS FROM VINYL MONOMERS AND UNSATURATED POLYOLS CONTAINING ALKENYL ARYL CONSTITUENTS AND POLYURETHANES PREPARED THEREFROM

[75] Inventors: Frank J. Preston, Madison; Kiran B. Chandalia, Cheshire, both of Conn.

[73] Assignee: Olin Corporation, New Haven, Conn.

[21] Appl. No.: 783,354

[22] Filed: Mar. 31, 1977

[51] Int. Cl.$^2$ ................. C08F 12/24; C08G 18/63
[52] U.S. Cl. ........................ 260/33.2 R; 521/137; 526/209; 526/210; 526/295; 526/320; 526/333
[58] Field of Search ............... 260/2.5 BE, 33.2 R; 526/320, 333, 334, 295, 209, 210

[56] References Cited

U.S. PATENT DOCUMENTS

| | | | |
|---|---|---|---|
| Re. 29,118 | 1/1977 | Stamberger | 260/2.5 BE |
| 3,041,319 | 6/1962 | Abramo | 526/334 |
| 3,100,804 | 8/1963 | Abramo | 526/334 |
| 3,190,925 | 6/1965 | Stowe | 526/333 |
| 3,523,093 | 8/1970 | Stamberger | 260/2.5 BE |
| 3,931,092 | 1/1976 | Ramlow | 526/320 |
| 3,931,450 | 1/1976 | Patton | 260/2.5 BE |
| 3,953,393 | 4/1976 | Ramlow | 260/33.2 R |
| 3,966,521 | 6/1976 | Patton | 260/33.2 R |
| 4,014,846 | 3/1977 | Ramlow | 260/2.5 BE |

*Primary Examiner*—C. Warren Ivy
*Attorney, Agent, or Firm*—Robert J. Feltovic; Thomas P. O'Day

[57] ABSTRACT

Graft copolymers of vinyl monomers and unsaturated polyols are described. These copolymers are prepared by the polymerization of an ethylenically unsaturated monomer, or a mixture of such monomers, in a polyol comprising an alkenyl aryl polyol. The alkenyl aryl constituents render the polyols compatible for graft copolymerization with the vinyl monomers. The graft copolymers are useful in polyurethane formulations.

26 Claims, No Drawings

GRAFT COPOLYMERS FROM VINYL MONOMERS AND UNSATURATED POLYOLS CONTAINING ALKENYL ARYL CONSTITUENTS AND POLYURETHANES PREPARED THEREFROM

BACKGROUND OF THE INVENTION

1. Field of the Invention

The invention relates to graft copolymers of ethylenically unsaturated monomers and unsaturated polyols containing alkenyl aryl constituents. The invention further relates to the use of these graft copolymers in polyurethane formulations.

2. Prior Art

A great deal of art has arisen focusing on methods for increasing the overall molecular weight of polyols without seriously affecting chain length and attendant fluidity, by incorporating polymeric materials onto the polyol by grafting. Such graft copolymer polyol dispersions have proven to be advantageous when used in polyurethane formulations to achieve desirable polyurethane product properties, such as enhanced load bearing and resiliency in foams.

It is known in the art to prepare graft copolymer dispersions from vinyl monomers and polyols and to use these copolymers in the formulation of urethane polymers. For example, U.S. Pat. No. 3,383,351 to Stamberger teaches that ethylenically unsaturated monomers may be polymerized in a polyol medium. As evidenced by Patton et al. in U.S. Pat. No. 3,966,521, graft copolymers could also be formed by reacting vinyl monomers in polyols containing some degree of unsaturation. Both of these patents, however, fail to show graft copolymers which are prepared from vinyl monomers and alkenyl aryl polyols.

Graft copolymers also are described in U.S. Pat. No. 3,190,925 to Stowe which are prepared by copolymerizing an ethylenically unsaturated monomer with an alkenyl benzyl polyglycol such as:

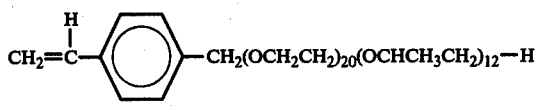

However, these graft copolymers are not prepared from alkenyl aryl polyols, and, hence, do not contain the multiple hydroxyl groups as are required for use in polyurethane formulations.

SUMMARY OF THE INVENTION

Now, an improved graft copolymer has been developed which can be prepared by reacting ethylenically unsaturated monomer in a polyol comprising an alkenyl aryl polyol. Presence of the alkenyl aryl constituent on the polyol enhances graft copolymerization reactivity with unsaturated monomers. The resulting graft copolymers feature multiple hydroxyl groups and are used in polyurethane formulations.

DESCRIPTION OF THE PREFERRED EMBODIMENTS

The graft copolymers of the present invention can be prepared by reacting certain alkenyl aryl polyols with ethylenically unsaturated monomers.

The alkenyl aryl polyol reactant can be represented by the general formula:

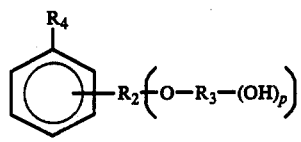

wherein:
$R_4$ is straight or branched chain alkenyl of 2 to 10 carbons,
$R_2$ is lower alkylene of 1–4 carbons, or

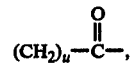

where u is an integer from 0 to 3,
p is an integer from 2–5, and $-O-R_3-OH_p$) is a residue of a polyol $R_3(OH)_{p+1}$, having an equivalent weight ranging from 250 to 5000, after removal of one hydroxy hydrogen therefrom.

These alkenyl aryl polyol reactants can be prepared by reacting a polyol with an alkenyl aryl reactant which contains a second functionality reactive with a polyol. This second reactive functionality may be such as an alkyl halide, a carboxylic acid or acid halide group, or an ester. These functionalitites are reactive with a hydroxyl group of a polyol so that the alkenyl aryl group can be incorporated onto the polyol chain.

The alkenyl aryl reactant can be represented by the general formula:

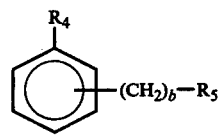

wherein:
$R_4$ is straight or branched chain alkenyl of 2 to 10 carbons,
b is an integer from 0 to 3, and
$R_5$ is a methyl halide group, a carboxylic acid group, corresponding carboxylic acid halides, or corresponding carboxylic acid lower alkyl esters of 1 to 4 carbons.

The alkenyl aryl compounds which can be used to form the alkenyl aryl polyol include alkenyl aryl carboxylic acids such as alkenyl benzoic acids, alkenyl phenyl acetic acids, alkenyl phenyl propionic acids, alkenyl phenyl butyric acids, and the like, and their functional derivatives such as their acid halides and esters, which readily can be prepared from the acids by conventional means. Other alkenyl aryl compounds also include alkenyl aryl alkyl halides such as alkenyl benzyl halides, alkenyl phenyl ethyl halides, alkenyl phenyl propyl halides, alkenyl phenyl butyl halides, and the like. The alkenyl segment of these compounds includes straight and branched chain alkenyl, such as ethenyl, isopropenyl, propenyl, butenyl, octenyl, decenyl, and the like. Polyethylenic alkenyl groups (dienes, trienes, etc.) are also included, such as butadienyl, pentadienyl, heptatrienyl, decatrienyl, and the like. Preferred are alkenyl aryl reactants of the formula:

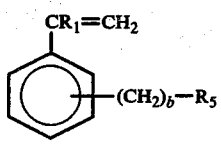

wherein $R_1$ is hydrogen or methyl and b and $R_5$ are as defined in Formula II above.

Vinyl aryl alkyl halide, in specific, chloromethyl styrene, is particularly preferred. The chloromethylstyrenes can be prepared by various known methods, such as are described in U.S. Pat. No. 3,049,503, column 2, lines 55–67.

The relative position of the second reactive functionality on the benzene ring of the alkenyl aryl compound is not critical to the invention. The preferred chloromethyl styrene reactants prepared by known methods commonly are ortho and para mixtures. It is further noted that one or more other constituents which are innocuous to the reaction, such as alkyl or halo constituents, may also be present at the open positions of the aromatic ring.

For purposes of simplicity in presentation, the preferred vinyl benzyl polyol reactants have been chosen for detailed discussion below. They can be prepared by a method exemplified by the following illustration:

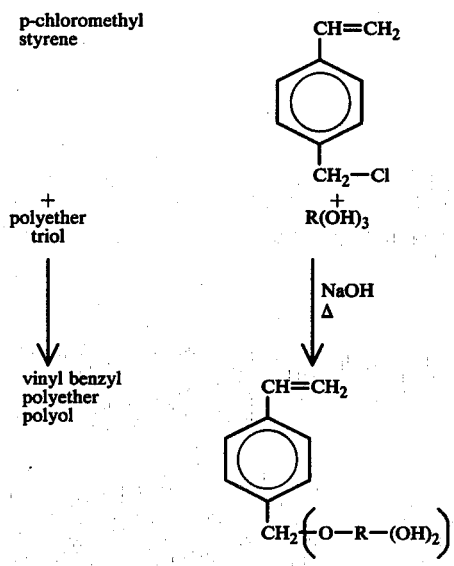

As depicted above, the vinyl alkenyl aryl compound having a second reactive functional alkyl halide group is reacted with the polyether triol. This ether-forming reaction takes place in the presence of sodium hydroxide at a temperature of about 50°–150° C. Through nucleophilic substitution, the halide ion of the vinyl monomer is replaced to result in the formation of the vinyl benzyl polyol. The reaction involved is detailed further in co-pending application, Attorney's Docket No. C-7085A, which is being filed concurrently herewith, and the entire disclosure of this application is hereby incorporated in its entirety by reference.

When the second reactive functionality of the alkenyl aryl monomer is a carboxylic acid, acid chloride or ester group, the reaction with the polyol is an esterification or a transesterification type reaction, proceeding in common fashion, in non-basic media.

The polyol reactant which is used in preparing the alkenyl aryl polyols of the invention can be any such compound, including mixtures of two or more such compounds, having 3–6 hydroxyl groups and preferably an average equivalent weight from about 250 to about 5000. This includes polyester polyols and polyether polyols. However, the polyether polyols are generally preferred.

The polyester polyols include the products of reacting polycarboxylic acids with the polyhydric alcohols. Illustrative polycarboxylic acids include, for example, oxalic, malonic, succinic, glutaric, adipic, pimelic, suberic, and azelaic acid and the like. Illustrative polyhydric alcohols include various triols, tetrols, and higher-functionality alcohols, such as glycerol, trimethylolpropane, pentaerythritol, sorbitol, mixtures thereof and the like.

The polyether polyols, the use of which is preferred herein, include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the polyether polyol reactant can be any such material which has from 3 to 6 active hydrogens. This includes (a) the aliphatic triols such as glycerol, trimethyolpropane, triethylolpropane, trimethylolhexane and the like, (b) higher-functionality alcohols such as sorbitol, pentaerythritol, methyl glucoside, and the like, (c) the polyamines such as tetraethylene diamine and (d) the alkanolamines such as diethanolamine, triethanolamine, and the like.

A preferred group of polyhydric initiators for use in preparing the polyether polyol reactant is one which comprises aliphatic triols such as glycerol, trimethylolpropane, and the like.

The alkylene oxide-polyhydric initiator condensation reaction is preferably carried out in the presence of a catalyst such as KOH as is well-known in the art. In effecting the reaction, a sufficient proportion of alkylene oxide is used as to provide a final polyol product having an average equivalent weight of about 250–5000, preferably about 700–3000, and more preferably about 1000–1500. The catalyst is thereafter preferably removed, leaving a polyether polyol which is ready for use in preparing the alkenyl aryl polyols of the invention.

To form the graft copolymers of the present invention, the alkenyl aryl polyols are treated with an ethylenically unsaturated monomer, or a mixture of such monomers, usually in the presence of additional polyol, selected from the polyols as defined above. The monomers useful in the copolymerization process are any polymerizable monomers characterized by the presence of at least one polymerizable ethylenic unsaturated group of the type

Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamine, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis (β-chloroethyl) vinyl phosphonate, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumerate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridiene, and the like. Any of the known polymerizable monomers can be used and the compounds listed above are illustrative and not restrictive of the monomers suitable for use in this invention.

Preferred monomers include styrene, acrylonitrile, vinyl chloride, methyl methacrylate, hydroxy ethyl acrylate, butadiene, isoprene, chloroprene, and the like. Styrene and acrylonitrile are particularly preferred.

The overall grafting reaction proceeds in a manner as is known in the art, using conventional reaction conditions, reactants, and proportions; the improvement being, however, including an unsaturated polyol comprising an alkenyl aryl polyol. The copolymerization can be characterized by the following example, where a vinyl benzyl polyether polyol and styrene have been chosen as illustrative reactants for purposes of presentation simplicity:

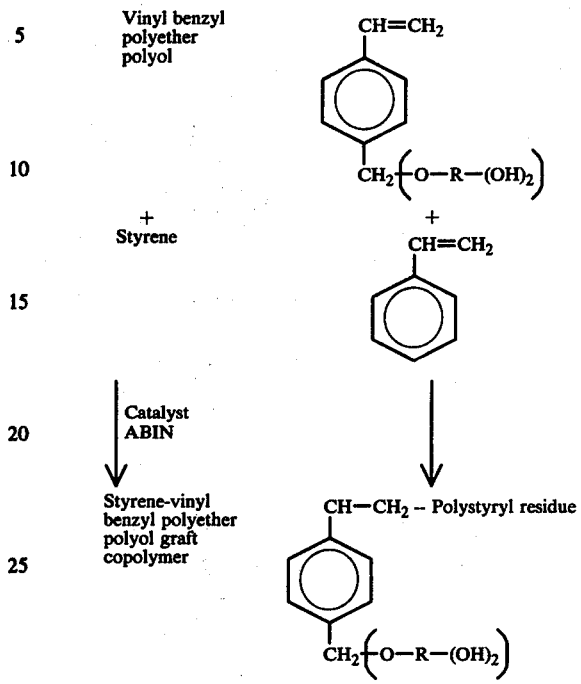

During the free radical grafting copolymerization, any suitable free radical initiator may be used. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide di-α-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoixde, trans-Decalin hydroperoxide, α-methylbenzyl hydroperoxide, α-methyl-α-ethyl benzyl hydroperoxide, Tetraline hydroperoxide, triphenylmethyl hydroperoxide, diphenylmethyl hydroperoxide, α-α-azo-2-methyl butyronitrile, α,α-2-methyl heptonitrile, 1,1'-azo-1-cyclohexane carbonitrile, dimethyl α,α'-azo-isobutyrate, 4,4'-azo-4-cyanopentanoic acid, azo-bis (isobutyronitrile), persuccinic acid, diisopropyl peroxy dicarbonate, and the like; a mixture of catalysts may also be used. Azo-bis (isobutyronitrile) is the preferred catalyst.

The amounts of the respective reactants in the graft copolymerization reaction determine the extent of copolymerized product present in the final graft copolymer dispersion. By varying the reactant proportions, a range of graft copolymerized products can be formed, which, in turn can be utilized in formulations to produce various polyurethane properties.

The alkenyl aryl polyol reactant may be reacted alone with unsaturated monomer, but preferably it is supplemented with additional polyol, selected from the polyol reactants defined previously above. Any unreacted monomer can readily be stripped from the product by conventional means. The graft copolymer product can be separated from unreacted polyol by standard means, such as solvent extraction. The alkenyl aryl polyol preferably is supplemented with additional polyol such that the alkenyl aryl polyol constitutes from 1 to 100 percent based on the weight of total polyol. Using about 40 to 60 percent alkenyl aryl polyol has been found to be most preferred. In forming the alkenyl aryl polyol reactant, it is advantageous to use excess polyol reactant, which preferably is allowed to remain with the product to result in an alkenyl aryl polyol-unreacted polyol mixture. An advantageous graft copolymerization reaction scheme is then to add monomer, catalyst and the azo-bis ester polyol-unreacted polyol mixture separately or combined to a heated reactor containing additional unreacted polyol in order to produce a graft copolymer of monomer and polyol dispersed in a polyol medium. Reaction temperatures normally range between about 80° to 170° C., preferably from about 90° to 140° C. Increasing viscosity of the reaction mixture indicates progress of the reaction.

The amount of ethylenically unsaturated monomer used in the polymerization reaction preferably ranges from about 1 to 30 percent, and most preferably from about 3 to 25 percent, based on the weight of total polyols.

The concentration of the catalyst can vary from about 1% to about 10%, preferably from about 2% to about 5% by weight based on the weight of the monomer.

The graft copolymer dispersions of the present invention are particularly suited for use in polyurethane formulations, as shown in Examples VI and VII below. The presence of the multiple terminal hydroxyl groups allows the polyurethane forming reaction with organic polyisocyanates. Modification of the amount of terminal hydroxyl causes variation of resulting polyurethane products. The amount of branching and cross-linking is directly dependent on the number of hydroxyl groups in the original resin. Properties can be varied to form polyurethane products such as elastic fibers, elastomers, or flexible, semi-rigid, or rigid foams.

Although the invention is of utility in the preparation of non-cellular polyurethanes as well as polyurethane foams, the preparation of foams according to the invention is preferred.

In the preparation of the present polyurethane foams, either of the general forming processes, the "one-shot" or the "prepolymer" processes, may be utilized. Any combination of graft copolymer, additional polyol, organic polyisocyanate, foaming agent, catalyst, and other reactant capable of forming a polyurethane foam forming reaction mixture can be employed.

The organic polyisocyanates used in the polyurethane foams of this invention include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), 3,3'-bitoluene-4,4-diisocyanate, hexamethylene diisocyanate, naphthalene 1,5-diisocyanate, the polymeric isocyanates such as polyphenylene polymethylene isocyanate, and the like, and mixtures thereof. The amount of isocyanate employed in the present process should generally be sufficient to provide at least about 0.7 NCO group per hydroxy group in the reaction system, which includes the graft copolymers, polyols, as well as any additional material and/or foaming agent present. In practice, polyisocyanate is usually used in a proportion to provide no more than about 1.25 NCO groups per each hydroxy group. A 100 multiple of the ratio of NCO to OH groups in the reaction system is referred to as the "index."

Any suitable foaming agent, or mixture of foaming agents may be employed. These include inorganic foaming agents, such as water, and organic foaming agents containing up to seven carbon atoms such as the halogenated hydrocarbons, and thw low molecular weight alkanes, alkenes, and ethers. Illustrative organic agents include monofluorotrichloromethane, dichlorofluoromethane, dichlorodifluoromethane, 1,1,2-trichloro-1,2,2,-trifluoroethane, methylene chloride, chloroform, carbon tetrachloride, methane, ethane, ethylene, propylene, hexane, ethyl ether diisopropyl ether, mixtures thereof and the like. Water and the low molecular weight polyhalogenated alkanes, such as monofluorotrichloromethane and dichlorodifluoromethane, are preferred. The amount of foaming can be varied over a wide range.

The catalyst employed in preparing the foams of the invention may be any of the catalysts known to be useful for this purpose, including tertiary amines, organo-metallic salts, and a mixture of an organo-metallic salt with one or more tertiary amine, the latter being preferred. Typical tertiary amines include for example triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark Niax A-1, methyldicyclohexylamine, N-cyclohexylmorpholine, dimethylcyclohexylamine, methyldiethanolamine, a mixture of dimethylcyclohexylamine and 2(3-pentyl)-1-dimethylaminocyclohexane such as may be purchased commercially under the Trademark Polycat, bis(dimethylaminoethylpropylether), mixtures of triethylene diamine and dipropylene glycol such as the 1:2 and 1:4 weight ratio mixtures which may be purchased commercially under the trademarks Dabco 33LV and Dabco 8020, respectively, bis(dimethylaminopropylether), and mixtures of these catalysts. The preferred tertiary amine catalysts are triethylenediamine, mixtures of triethylenediamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The teriary amine catalyst is used in a proportion of about 0.1–1.5, and preferably about 0.25–0.75, parts per 100 parts by weight of the total polyol which is employed in preparing the foam.

Typical organo-metallic salts include for example the salts of tin, titanium, antimony, aluminum, cobalt zinc, bismuth, lead, and cadmium, the tin salts, i.e., stannic and stannous salts, being preferred. Illustratively such salts include the octoates, dilaurates, diacetate, dioctoates, oleates, and neodeconates of these metals, the octoates being preferred. The organometallic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers, U.S. Pat. No. 2,834,748 and T. H. Ferringno, *Rigid Plastic Foams* (New York: Reinhold Publishing Corp., 1963), pp. 34-42, discloses various surfactants which are useful for this purpose. A preferred group of surfactants are the polysiloxanes such as may be purchased under the trademark "Niax L-5303." Generally, up to two parts by weight of the surfactant are employed per 100 parts of total polyol.

The following examples are provided to further illustrate the invention. All parts and percentages are by weight unless otherwise specified.

PREPARATION OF ALKENYL ARYL POLYOLS

EXAMPLE I

Preparation of Vinyl Benzyl Polyol Ether 3 g. (0.075 moles) NaOH was added to 325 g. (0.072 moles) of a polyether triol made from glycerin by block addition of propylene oxide capped by ethylene oxide to form a polyether triol having > 70% primary hydroxyl groups and an average molecular weight of about 4500. The mixture was stirred under $N_2$ at 90 to 100° C. for two hours, until all the NaOH dissolved. 6 g. (0.04 moles) of chloromethyl styrene was then added and the reaction was allowed to continue for two hours at 90° C. The product was then treated with 16 g. supercel and 16 g. mangesol to remove the salt and any unreacted NaOH, filtered through Whatman No. 1 filter paper, and then stripped at 2 mm Hg at 100° C. for one hour to remove any unreacted chloromethyl styrene reactant.

UV and IR analyses indicated the presence of vinyl and benzene moieties to confirm formation of the vinyl benzyl polyol ether product. The OH number was analyzed to be 31.0 mg KOH/g. This is in good agreement with the theoretical OH number of 31.0 mg KOH/g for the anticipated vinyl benzyl polyol ether product.

EXAMPLE II

Preparation of Vinyl Benzyl Polyol Ether

A 3-liter, three neck flask equipped with $N_2$ inlet, thermometer, feed inlet, and stirrer was charged with 1500 gm. (0.332 moles) of a polyether triol made from glycerol by block addition of propylene oxide capped with ethylene oxide to form a polyether triol having about 4500 molecular weight containing 10% EO as end block. To this was added about 28 gm of a 50% solution of sodium hydroxide in water. The mixture was purged with $N_2$ under surface for 20 minutes. The flask was then heated to 110° C. for two hours. The water then was purged out with $N_2$ and the reactor was cooled to 50° C. 27.7 g. (0.185 moles) of vinyl benzyl chloride was then added dropwise. The reaction was allowed to continue for 4½ hours. The contents showed the formation of a white solid (likely to be NaCl, a by-product of reaction).

The salt and any unreacted NaOH were removed by clay treatment. 30 gm microcell, 30 gm magnesol, and 15 gm celite were added to the flask and mixed at 110° C. for two hours. The material was then filtered hot through Whatman No. 1 filter paper with < 5 mm Hg. pressure. A yellow, clear product was obtained, which was stripped to remove unreacted vinyl benzyl chloride. UV indicated the presence of a benzene ring and unsaturation moieties to confirm formation of the vinyl benzyl polyol ether product. This material had a hydroxyl number or 33.8 mg KOH/g and unsaturation equal to 0.15 milliequivalent/gm.

PREPARATION OF GRAFT COPOLYMERS

EXAMPLE III

The product of Example I was used to make a graft copolymer with styrene by free radical reaction.

15 g of the product of Example I was mixed with 5 g styrene and 0.4 g ABIN (azo-bis-isobutyronitrile). The mixture was stirred at 80°-95° C. for one hour. The product was then stripped to remove any unreacted styrene. The viscosity of the product was 6400 cps. NMR analysis for aliphatic and aromatic protons showed that the product contained 23% styrene. Gel Permeation Chromatography molecular weight analysis confirmed copolymer formation.

EXAMPLE IV

The product of Example I was used to make a graft copolymer with styrene and acrylonitrile by free radical reaction.

24 g. of the product of Example I was added to 16 g. of the polyol reactant used in Example I and this was stirred and heated, under $N_2$, at 100° C. to form a uniform blend. To this was added a mixture of 4.5 g. styrene, 0.5 g. acrylonitrile, and 0.15 g. ABIN, and allowed to react for one hour at 80°-95° C. The product was then stripped to remove any unreacted monomers. The viscosity of the product was found to be 1500 cps at 25° C. (about 700 units more than the starting polyol reactant). The graft copolymer product was determined to contain about 11% polyethylenic residues. GPC confirmed copolymer formation. The copolymer product was yellow, but non-turbid.

EXAMPLE V

The vinyl benzyl polyol (product of Example II) was used to make a copolymer with styrene as follows:

A 1-liter three neck flask equipped with $N_2$ inlet, feed inlet, stirrer, thermometer, and reflux condenser was charged with 222 gm of the polyether triol reactant used in Example II. The flask was heated under a $N_2$ blanket to 100° C. A "blend" of 1.7 gm azo-bis-isobutyronitrile, 6.0 gm acrylonitrile, 50 gm styrene, and 222 gm of the alkenyl aryl polyol product material from Example II was made. When the flask reached 100° C., the above-described blend was fed to the flask at a steady rate of 1.4 gm/min. The feed time was three hours and twenty minutes. At the end of feeding operation, the reaction was allowed to continue for one hour. The material was then stripped at 100° C. and <5 mm Hg vacuum to remove any unreacted monomer. The material balance at the end showed that 96% of the monomers charged reacted to form graft copolymer.

The final product had a viscosity of 4750 cps (at 25° C.), hydroxyl number of 33.1 mg KOH/gm. The material is slightly yellow in color and translucent.

URETHANE FOAM FORMATION
EXAMPLE VI

A cellular flexible urethane foam was made by using the product of Example V. The general process scheme for making such a foam is widely known. The following formulation was used:

| | Parts by Weight |
|---|---|
| Polyether triol[1] | 80 |
| Copolymer of Ex. V | 20 |
| Diethanol Amine | 0.8 |
| Triethylene Diamine[2] | 0.4 |
| Surfactant[3] | 1.3 |
| Water | 2.0 |
| Dibutyl tin dilaurate | 0.1 |
| TDI-80[4] [Index] | 109 |

[1] 6500 MW triol-prepared from glycerol by base catalyzed block addition of propylene oxide capped with ethylene oxide such that the primary hydroxyl content is 68% and the final OH No. is 26 mg KOH/gm.
[2] This is a commercially available product sold under the trademark "DABCO 33LV." It consists primarily of triethylene diamine (1/3) and dipropylene glycol (2/3).
[3] This is a commercially available polysiloxane surfactant sold under the trademark "NIAX L-5303."
[4] This is a mixture of toluene diisocyanate isomers (80/20 mixture of 2,4/2,6-isomers).

The foam processing was good. The gel time was 100 seconds. Following foam physicals were obtained:

| | | |
|---|---|---|
| Density[1] | | 2.81 |
| ILD[2] | | |
| Compression Deflection | 25% | 0.28 |
| | 65% | 0.74 |
| Saf Factor | | 2.68 |
| Tensile Strength[3] | | 19.5 |
| Elongation[4] | | 163 |
| Tear Strength[5] | | 2.1 |

[1] lbs. per cubic foot.
[2] Indentation Load Deflection (lbs.) per ASTM D-1564-64T Sag Factor, a measure of the support of cushioning material, is expressed as a ratio of 65% ILD to 25% ILD.
[3] psi per ASTM 1564-64
[4] percent per ASTM 1564-64
[5] lbs. per linear inch per ASTM 1564-64

URETHANE FOAM FORMULATION
EXAMPLE VII

A cellular flexible urethane foam, similar to Example VI was made using the following formulation (see Example VI for definitions):

| | Parts by Weight |
|---|---|
| Polyether Triol[1] | 80 |
| Copolymer of Ex. V | 20 |
| Diethanol amine | 0.8 |
| Triethylene Diamine | 0.4 |
| Surfactant | 1.0 |
| Water | 2.0 |
| Dibutyl tin dilaurate | 0.1 |
| TDI-80 [Index] | 109 |

[1] A 4500 MW triol-prepared from glycerol by base catalyzed block addition of propylene oxide capped with ethylene oxide. The primary hydroxyl content is 55% and the final OH No. is 37 mg KOH/gm.

The foam processing was good. The gel time was 100 seconds. Following foam physicals[1] were obtained:

| | | |
|---|---|---|
| Density | | 3.08 |
| Compression Deflection | 25% | 0.25 |
| | 65% | 0.80 |
| Sag Factor | | 3.19 |
| Tensile Strength | | 17.8 |
| Elongation | | 97 |
| Tear Strength | | 1.09 |

[1] See Example VI for definitions.

COMPARATIVE EXAMPLES
EXAMPLE VIII
GRAFT COPOLYMER CONTROL RUN

A control run similar to that of Example III was made, using, however, the polyether triol reactant of Example I rather than the styryl polyether polyol product of Example I. At the end of one hour a nonuniform material containing chunks of white solid was obtained. This indicated that in the control run, most of the styrene homopolymerized to polystyrene with minimal if any copolymerization with the polyether triol.

EXAMPLES IX AND X
POLYURETHANE FOAM PREPARATION

Foam formulations were prepared as in Examples VI and VII respectively, using however 100 parts of the polyether triol reactant and none of the graft copolymer of Example V. In each case, the foam collapsed before it gelled. Successful foam preparation could not be accomplished.

We claim:

1. In a process for the preparation of graft copolymer polyols which comprises polymerizing an ethylenically unsaturated monomer or a mixture of such monomers in a polyol in the presence of a free radical catalyst, the improvement characterized by polymerizing the unsaturated monomer in a polyol comprising an alkenyl aryl polyol of the formula:

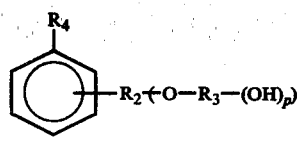

wherein:

$R_4$ represents straight or branched chain alkenyl of 2 to 10 carbons;

$R_2$ represents lower alkylene of 1 to 4 carbons, or

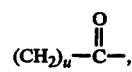

where $u$ is an integer from 0 to 3;

$p$ is an integer from 2–5; and $(O-R_3-(OH)_p)$ represents a residue of a polyether or polyester polyol, $R_3(OH)_{p+1}$, wherein $R_3$ represents a polyether or polyester chain, said polyol having an equivalent weight ranging from about 250 to 5000, after removal of one hydroxy hydrogen therefrom.

2. The process of claim 1 wherein the monomer is polymerized in a polyol mixture comprising an alkenyl aryl polyol and an additional polyol, $R_3(OH)_{p+1}$.

3. The process of claim 2 wherein the monomer is selected from the group consisting of styrene, acrylonitrile, vinyl chloride, methyl methacrylate, hydroxy ethyl acrylate, butadiene, isoprene, chloroprene, and mixtures thereof.

4. The process of claim 2 wherein the monomer is selected from styrene, acrylonitrile, and mixtures thereof.

5. The process of claim 2 wherein the monomer ranges in amount from about 1 to 30 percent based on total polyol weight.

6. The process of claim 2 wherein $-(O-R_3-(OH)_p)$ represents a residue of a polyether triol.

7. The process of claim 6 wherein the polyether triol has an average equivalent weight of about 1000 to 1500.

8. The process of claim 2 wherein the $R_4$ constituent of the alkenyl aryl polyol is alkenyl containing one carbon to carbon double bond.

9. The process of claim 8 wherein $R_4$ represents $-CR_1=CH_2$ where $R_1$ is hydrogen or methyl.

10. The process of claim 9 wherein $R_1$ is hydrogen.

11. The process of claim 9 wherein $R_2$ represents $-CH_2-$.

12. The process of claim 11 wherein $-(O-R_3-(OH)_p)$ represents a residue of a polyether polyol.

13. The process of claim 12 wherein the polyether polyol is a polyether triol.

14. The process of claim 13 wherein the polyether triol has an average equivalent weight of about 700 to 3000.

15. The process of claim 14 wherein the polyether triol has an average equivalent weight of about 1000 to 1500.

16. The process of claim 13 wherein the polyether polyol is the product of reacting a polyhydric initiator with an alkylene oxide or mixture of alkylene oxides using random or step-wise addition.

17. The process of claim 15 wherein the polyether triol is the product of reacting a glycerin initiator with alkylene oxide selected from the group consisting of propylene oxide, ethylene oxide or mixtures thereof, using random or step-wise addition.

18. The process of claim 13 wherein the monomer is selected from the group consisting of styrene, acrylonitrile, vinyl chloride, methyl methacrylate, hydroxy ethyl acrylate, butadiene, isoprene, chloroprene, and mixtures thereof.

19. The process of claim 18 wherein the monomer is selected from the group consisting of styrene, acrylonitrile, and mixtures thereof.

20. The process of claim 19 wherein the monomer ranges in amount from about 1 to 30 percent based on total polyol weight.

21. A graft copolymer prepared according to the process of claim 1.

22. A graft copolymer dispersion prepared according to the process of claim 2.

23. A graft copolymer dispersion prepared according to the process of claim 6.

24. A graft copolymer dispersion prepared according to the process of claim 11.

25. A graft copolymer dispersion prepared according to the process of claim 13.

26. A graft copolymer dispersion prepared according to the process of claim 17.

* * * * *